United States Patent
Sato et al.

(10) Patent No.: US 12,117,662 B2
(45) Date of Patent: Oct. 15, 2024

(54) INTERMITTENT CONNECTION-TYPE OPTICAL FIBER TAPE CORE, OPTICAL FIBER CABLE AND CONNECTOR-EQUIPPED OPTICAL FIBER CORD

(71) Applicant: SUMITOMO ELECTRIC INDUSTRIES, LTD., Osaka (JP)

(72) Inventors: Fumiaki Sato, Osaka (JP); Kenta Tsuchiya, Osaka (JP); Tsuguo Amano, Osaka (JP); Masakazu Takami, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 306 days.

(21) Appl. No.: 17/440,594

(22) PCT Filed: Mar. 19, 2020

(86) PCT No.: PCT/JP2020/012419
§ 371 (c)(1),
(2) Date: Sep. 17, 2021

(87) PCT Pub. No.: WO2020/189772
PCT Pub. Date: Sep. 24, 2020

(65) Prior Publication Data
US 2022/0196945 A1    Jun. 23, 2022

(30) Foreign Application Priority Data
Mar. 20, 2019 (JP) ................................. 2019-052762

(51) Int. Cl.
*G02B 6/44* (2006.01)
*G02B 6/38* (2006.01)

(52) U.S. Cl.
CPC ......... *G02B 6/4404* (2013.01); *G02B 6/3885* (2013.01); *G02B 6/441* (2013.01)

(58) Field of Classification Search
CPC ................................................... G02B 6/4404
See application file for complete search history.

(56) References Cited

U.S. PATENT DOCUMENTS 6,584,257 B1 * 6/2003 Hurley ................. G02B 6/4471
                                                            385/109
8,548,294 B2 * 10/2013 Toge .................... G02B 6/4433
                                                            385/114

(Continued)

FOREIGN PATENT DOCUMENTS

CN    105229510 A  *  1/2016  .......... G02B 6/4404
EP      3422062 A1     1/2019

(Continued)

OTHER PUBLICATIONS

JP 2005114750 A English translation (Year: 2005).*

(Continued)

*Primary Examiner* — Charlie Y Peng
(74) *Attorney, Agent, or Firm* — Faegre Drinker Biddle & Reath LLP

(57) ABSTRACT

This intermittent connection-type optical fiber tape core is configured in a manner such that in a state where a plurality of optical fiber cores are arranged in parallel in a direction perpendicular to the lengthwise direction of said plurality of optical fiber cores, some or all of the intervals between the plurality of optical fiber cores are intermittently provided in the lengthwise direction with connected sections where the intervals between adjacent optical fiber cores are connected and non-connected sections where the intervals between adjacent optical fiber cores are not connected. The outer diameter of each of the plurality of optical fiber cores is 160-220 μm, inclusive. The catenary amount of the tip end (Continued)

of the intermittent connection-type optical fiber tape core projecting from the held location is 0.1-2 mm, inclusive, in a given state.

8 Claims, 11 Drawing Sheets

(56) References Cited

U.S. PATENT DOCUMENTS

| | | | | |
|---|---|---|---|---|
| 9,116,321 | B2* | 8/2015 | Sato | G02B 6/4434 |
| 10,989,888 | B2* | 4/2021 | Debban | B05D 1/02 |
| 2005/0226573 | A1 | 10/2005 | Okuno et al. | |
| 2016/0161692 | A1* | 6/2016 | Namazue | G02B 6/2555 |
| | | | | 385/114 |
| 2017/0090135 | A1* | 3/2017 | Sato | G02B 6/4405 |
| 2017/0115461 | A1 | 4/2017 | Namazue et al. | |
| 2017/0184803 | A1 | 6/2017 | Namazue et al. | |
| 2017/0307815 | A1 | 10/2017 | Iwaguchi et al. | |
| 2018/0273427 | A1 | 9/2018 | Tanaka et al. | |
| 2019/0204519 | A1 | 7/2019 | Sato et al. | |
| 2020/0183111 | A1 | 6/2020 | Sato et al. | |
| 2020/0218020 | A1 | 7/2020 | Namazue et al. | |

FOREIGN PATENT DOCUMENTS

| | | |
|---|---|---|
| EP | 3470900 A1 | 4/2019 |
| JP | 2005-062427 A | 3/2005 |
| JP | 2013-088617 A | 5/2013 |
| JP | 2015-007714 A | 1/2015 |
| WO | WO-2017/082200 A1 | 5/2017 |
| WO | WO-2017/094560 A1 | 6/2017 |
| WO | WO-2017-145955 A1 | 8/2017 |
| WO | WO-2017/217559 A1 | 12/2017 |
| WO | WO-2018-182670 A1 | 10/2018 |

OTHER PUBLICATIONS

JP 2014010439 A English translation (Year: 2014).*
JP 2007272099 A English translation (Year: 2007).*
Anonymous: "Catenary—Wikipedia", Mar. 13, 2022 (Mar. 13, 2022), XP055901369, URL:https://on.wikipedia.org/wiki/Catenary.

* cited by examiner

_US 12,117,662 B2_

INTERMITTENT CONNECTION-TYPE OPTICAL FIBER TAPE CORE, OPTICAL FIBER CABLE AND CONNECTOR-EQUIPPED OPTICAL FIBER CORD

TECHNICAL FIELD

The present disclosure relates to an intermittent connection-type optical fiber ribbon, an optical fiber cable, and a connector-equipped optical fiber cord.

The present application claims priority from Japanese Patent Application No. 2019-052762 filed on Mar. 20, 2019, contents of which are incorporated by reference in its entirety.

BACKGROUND ART

Patent Literature 1 discloses an optical fiber ribbon in which an optical fiber tape resin is divided by a divided portion provided intermittently along a longitudinal direction of the optical fiber ribbon, and the optical fiber tape resin remains in a non-divided portion in a state where the optical fiber tape resin is continuous in the longitudinal direction.

Patent Literature 2 discloses an optical fiber ribbon in which three-core or more optical fibers are arranged in parallel. In the optical fiber ribbon, two adjacent optical fibers are connected by a connected section, and the connected section is intermittently provided in each of a longitudinal direction of the optical fiber ribbon and a width direction of the optical fiber ribbon. Further, Patent Literature 2 discloses that an outer diameter of an optical fiber constituting the optical fiber ribbon is 220 μm or less, and a distance between centers of adjacent optical fibers is 250 μm±30 μm.

CITATION LIST

Patent Literature

Patent Literature 1: JP-A-2005-62427
Patent Literature 2: JP-A-2013-88617

SUMMARY OF INVENTION

An intermittent connection-type optical fiber ribbon according to an aspect of the present disclosure includes
 a plurality of optical fibers, a connected section in a state where adjacent optical fibers are connected, and a non-connected section in a state where adjacent optical fibers are not connected, the connected section and the non-connected section being intermittently provided in a longitudinal direction of the plurality of optical fibers for a part or all of the plurality of optical fibers in a state where the plurality of optical fibers are arranged in a direction orthogonal to the longitudinal direction.
 An outer diameter of each of the plurality of optical fibers is 160 μm or more and 220 μm or less.
 When the intermittent connection-type optical fiber ribbon is held in a horizontal direction from a position of 30 mm with reference to a tip of the intermittent connection-type optical fiber ribbon to a predetermined position, a catenary amount of the tip of the intermittent connection-type optical fiber ribbon that protrudes from a held portion is 0.1 mm or more and 2 mm or less.

An optical fiber cable according to an aspect of the present disclosure includes
 the intermittent connection-type optical fiber ribbon that is mounted in the optical fiber cable, in which
 a core density is 4.5 core/mm$^2$ or more.

A connector-equipped optical fiber cord according to an aspect of the present disclosure includes
 an optical fiber cord including the intermittent connection-type optical fiber ribbon, and a connector connected to the optical fiber cord.

DESCRIPTION OF EMBODIMENTS

Technical Problem

Figure 1:
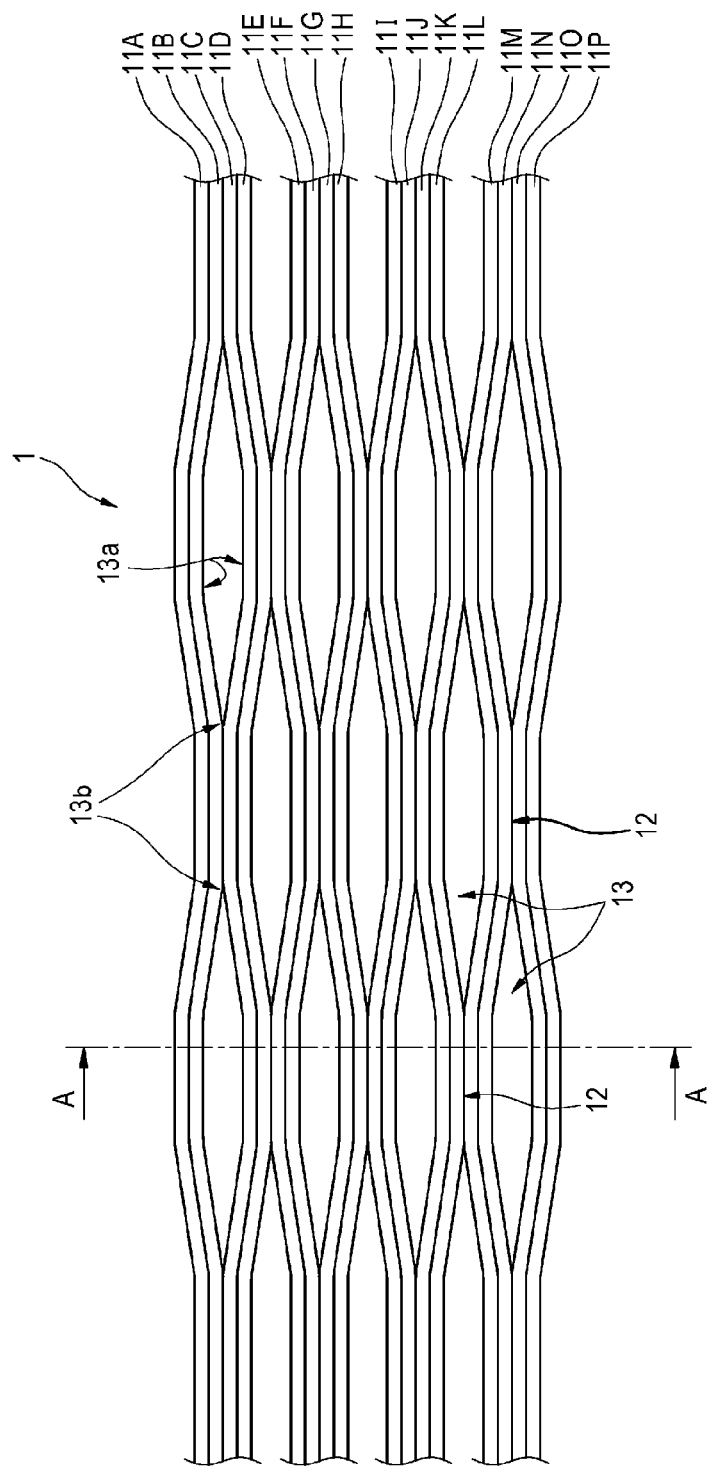
FIG. 1 is a view showing an example of an intermittent connection-type optical fiber ribbon according to an embodiment.

When discussing an increase in a density of optical fibers in an optical fiber cable, it is considered to mount an intermittent connection-type optical fiber ribbon using optical fibers having a diameter smaller than 250 μm in the related art.

When the intermittent connection-type optical fiber ribbon in the related art such as the optical fiber ribbons disclosed in Patent Literature 1 and Patent Literature 2 uses thin optical fibers as described above and is formed with a divided portion and an intermittent pattern portion (connected section and non-connected section), rigidity of the optical fiber ribbon is likely to be low and the optical fiber ribbon is likely to be deflected. It is difficult to set the intermittent connection-type optical fiber ribbon at an accurate fusion position using a fiber holder when the intermittent connection-type optical fiber ribbon is collectively fusion-spliced. When the fused intermittent connection-type optical fiber ribbon is conveyed to a protective sleeve heating unit, optical fibers are likely to be deflected and local bending is likely to occur in the fused intermittent connection-type optical fiber ribbon. On the other hand, when rigidity of the intermittent connection-type optical fiber ribbon is too high, it is difficult to deform the intermittent connection-type optical fiber ribbon. Therefore, when a bending pressure is applied, the intermittent connection-type optical fiber ribbon cannot absorb the bending pressure. Therefore, when the optical fiber ribbon is mounted in an optical fiber cable at a high density, a macro bending loss that is a bending loss due to an extremely small bending radius is likely to occur.

An object of the present disclosure is to provide an intermittent connection-type optical fiber ribbon, an optical fiber cable, and a connector-equipped optical fiber cord, in which even when optical fibers having a small diameter are used, the optical fibers are less likely to be deflected when the optical fibers are collectively fusion-spliced, and a macro bending loss is less likely to occur even when a density is increased.

DESCRIPTION OF EMBODIMENTS OF THE PRESENT DISCLOSURE

First, an embodiment of the present disclosure will be summarized and described.

An intermittent connection-type optical fiber ribbon according to an aspect of the present disclosure includes (1) a plurality of optical fibers, a connected section in a state where adjacent optical fibers are connected, and a non-connected section in a state where adjacent optical fibers are not connected, the connected section and the non-connected section being intermittently provided in a longitudinal direction of the plurality of optical fibers for a part or all of the plurality of optical fibers in a state where the plurality of optical fibers are arranged in a direction orthogonal to the longitudinal direction, in which an outer diameter of each of the plurality of optical fibers is 160 μm or more and 220 μm or less, when the intermittent connection-type optical fiber ribbon is held in a horizontal direction from a position of 30 mm with reference to a tip of the intermittent connection-type optical fiber ribbon to a predetermined position, a catenary amount of the tip of the intermittent connection-type optical fiber ribbon that protrudes from a held portion is 0.1 mm or more and 2 mm or less.

Even when the intermittent connection-type optical fiber ribbon according to the present disclosure uses small-diameter optical fibers having an outer diameter of 160 μm or more and 220 μm or less, a catenary amount of a tip that is held is 0.1 mm or more and 2 mm or less. That is, since the catenary amount is 2 mm or less, the rigidity is appropriately large, and optical fibers set in a fiber holder are less likely to be deflected. Therefore, positions of tips of the optical fibers are less likely to be misaligned when the optical fibers are collectively fusion-spliced. In addition, when the fused intermittent connection-type optical fiber ribbon is conveyed to a protective sleeve heating unit, local bending is less likely to occur. On the other hand, since the catenary amount is 0.1 mm or more, the intermittent connection-type optical fiber ribbon does not have too large rigidity, can be appropriately deformed against a bending pressure, and can absorb the bending pressure. Therefore, when the intermittent connection-type optical fiber ribbon is mounted in an optical fiber cable at a high density, a macro bending loss that is a bending loss due to an extremely small bending radius is less likely to occur.

(2) In the intermittent connection-type optical fiber ribbon, the number of the plurality of optical fibers may be 16, and a width in an arrangement direction of the plurality of optical fibers may be 3.5 mm or less.

According to this configuration, even when the number of optical fibers is 16, the width of the intermittent connection-type optical fiber ribbon in the arrangement direction is 3.5 mm or less. Therefore, the intermittent connection-type optical fiber ribbon can be collectively fusion-spliced using an existing fusion splicer that collectively fusion-spliced a 12-core optical fiber ribbon.

(3) A distance between centers of the adjacent optical fibers may be 200 μm±30 μm.

According to this configuration, since the distance between the centers of adjacent optical fibers is 200 μm±30 μm, the width of the intermittent connection-type optical fiber ribbon in the arrangement direction can be reduced.

(4) The number of the plurality of optical fibers may be a multiple of 8, and may be 16 or more.

According to this configuration, since the number of optical fibers is a multiple of 8, a bidirectional transmission is easily performed for every four cores. In addition, since the number of the optical fibers is 16 or more, rigidity of the intermittent connection-type optical fiber ribbon is easy to be increased.

(5) The plurality of optical fibers may have a bending loss of 0.25 dB/10 turns or less when a bending radius R is 15 mm.

According to this configuration, since the optical fibers have a bending loss of 0.25 dB/10 turns or less when the bending radius R is 15 mm, the bending loss can be reduced.

(6) Each of the plurality of optical fibers may include a glass fiber and a two-layer coating layer that covers a periphery of the glass fiber, an inner coating layer of the two-layer coating layer may be formed of a primary resin, an outer coating layer of the two-layer coating layer may be formed of a secondary resin, and the secondary resin may have a Young's modulus of 900 MPa or more at 23° C.

According to this configuration, since the Young's modulus of the secondary resin at 23° C. is 900 MPa or more, the coating layers on an outer side of the optical fiber have appropriate hardness. Therefore, a micro bending loss that occurs when an uneven lateral pressure is applied to the optical fiber is less likely to occur. Therefore, a lateral pressure property of the intermittent connection-type optical fiber ribbon is improved.

(7) In the intermittent connection-type optical fiber ribbon the connected section and the non-connected section may be formed for every four cores, the intermittent connection-type optical fiber ribbon may include the connected section where a tape resin that covers the optical fibers is continuous between adjacent optical fibers, and the non-connected section where a slit that passes through an upper surface and a lower surface of the intermittent connection-type optical fiber ribbon is formed relative to the tape resin between the adjacent optical fibers, and an end portion of the slit may be cut into an acute angle relative to a boundary between the connected section and the non-connected section.

According to this configuration, the tape resin of the connected section between the optical fibers where the non-connected section is formed can be easily ripped starting from the boundary where the end portion of the slit is formed by cutting the end portion into an acute angle. Since the non-connected section is formed for every four cores, the intermittent connection-type optical fiber ribbon can be easily divided for every four or a number of a multiple of four cores.

An optical fiber cable according to an aspect of the present disclosure includes (8) the intermittent connection-type optical fiber ribbon according to any one of (1) to (7) that is mounted in the optical fiber cable, in which
a core density is 4.5 core/mm$^2$ or more.

According to this configuration, since the optical fiber cable has a core density of 4.5 core/mm$^2$ or more, optical fibers can be mounted at a high density. Rigidity of the intermittent connection-type optical fiber ribbon mounted in the optical fiber cable is appropriately large. Therefore, positions of tips of the optical fibers are less likely to be misaligned when the intermittent connection-type optical fiber ribbon taken out from the optical fiber cable in which the optical fibers are mounted at a high density is collectively fusion-spliced. Further, local bending is less likely to occur in the fused intermittent connection-type optical fiber ribbon taken out from the optical fiber cable in the manner described above when the fused intermittent connection-type optical fiber ribbon is conveyed to a protective sleeve heating unit.

Further, the intermittent connection-type optical fiber ribbon does not have too large rigidity, can be appropriately deformed against a bending pressure, and can absorb the bending pressure. Therefore, when the intermittent connection-type optical fiber ribbon is mounted in the optical fiber cable at a high density, a macro bending loss that is a bending loss due to an extremely small bending radius is less likely to occur.

A connector-equipped optical fiber cord according to an aspect of the present disclosure includes (9) an optical fiber cord including the intermittent connection-type optical fiber ribbon according to any one of (1) to (7), and a connector connected to the optical fiber cord.

According to this configuration, since the intermittent connection-type optical fiber ribbon provided in the optical fiber cord has appropriately large rigidity, when the optical fibers are disassembled from one another and are set in a connector during manufacturing the connector-equipped optical fiber cord, the optical fibers are less likely to be deflected. Therefore, the optical fibers in the connector can be easily set in a desired arrangement and at a desired arrangement pitch, and thus it is possible to provide a connector-equipped optical fiber cord that is easily manufactured.

Further, the intermittent connection-type optical fiber ribbon does not have too large rigidity, can be appropriately deformed against a bending pressure, and can absorb the bending pressure. Therefore, even when the optical fibers are mounted in the optical fiber cord at a high density, a macro bending loss that is a bending loss due to an extremely small bending radius is less likely to occur.

Advantageous Effects of Invention

According to the present disclosure, it is possible to provide an intermittent connection-type optical fiber ribbon, an optical fiber cable, and a connector-equipped optical fiber cord, in which even when optical fibers having a small diameter are used, the optical fibers are less likely to be deflected when the optical fibers are collectively fusion-spliced, and a macro bending loss is less likely to occur even when a density is increased.

DETAILS OF EMBODIMENTS OF PRESENT DISCLOSURE

Specific examples of an intermittent connection-type optical fiber ribbon, an optical fiber cable, and a connector-equipped optical fiber cord according to an embodiment of the present disclosure will be described below with reference to the drawings.

The present disclosure is not limited to these examples, and is defined by the scope of the claims, and is intended to include all modifications within the scope and meaning equivalent to the scope of the claims.

Figure 2:
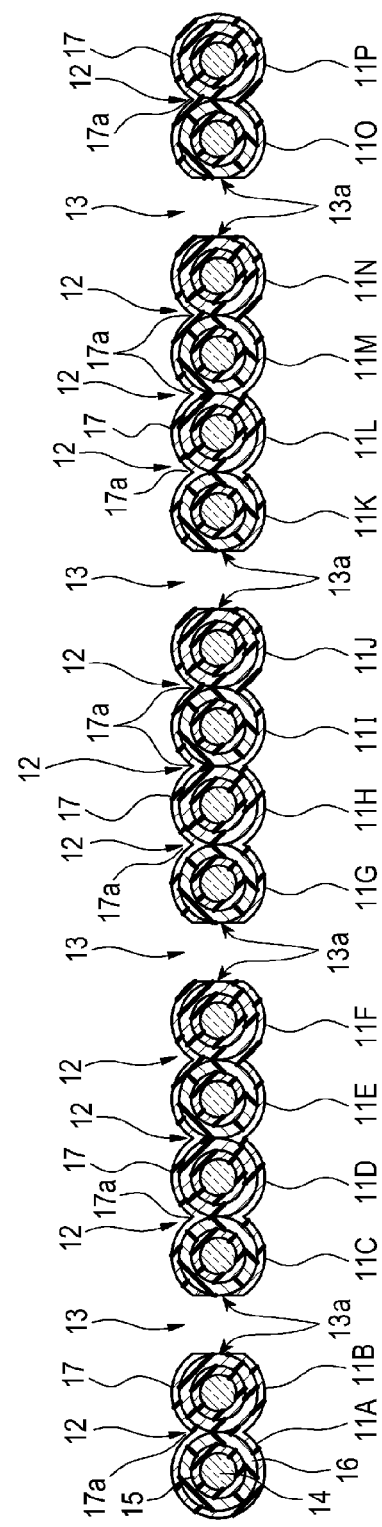
FIG. 2 is a cross-sectional view taken along a line A-A of the intermittent connection-type optical fiber ribbon shown in FIG. 1.
Figure 3:
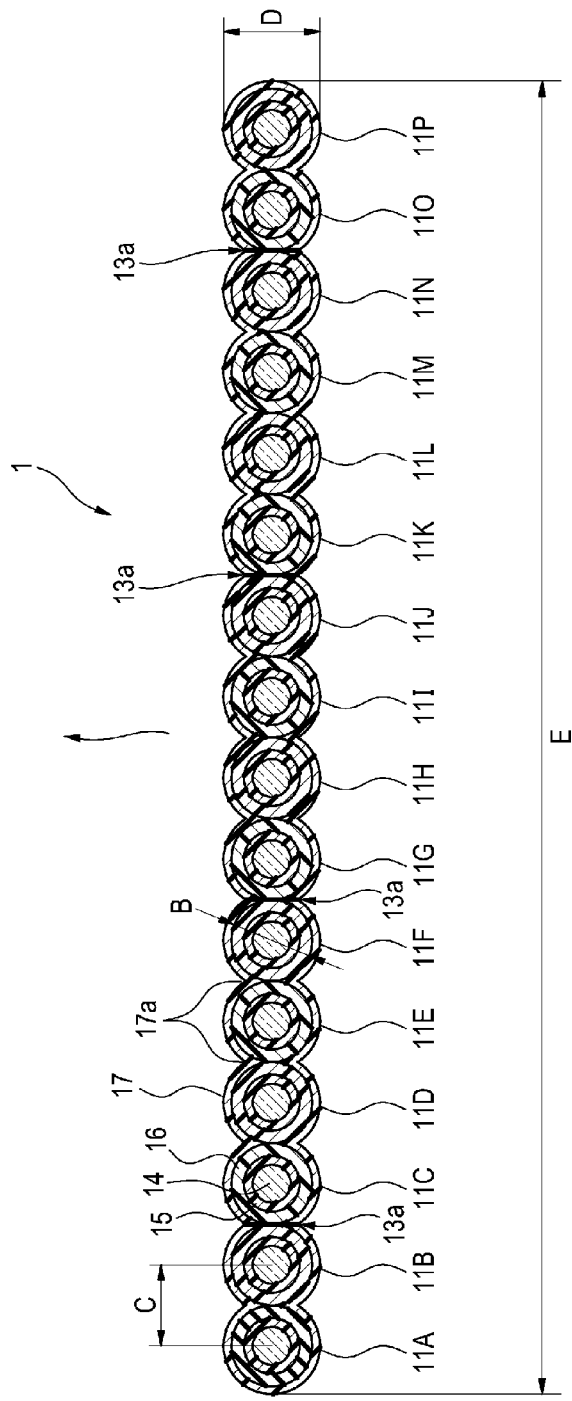
FIG. 3 is a cross-sectional view taken along the line A-A of the intermittent connection-type optical fiber ribbon shown in FIG. 1 in a state where non-connected sections are not expanded.

FIGS. 1 to 3 are views showing an example of an optical fiber ribbon. As shown in FIGS. 1 to 3, in an optical fiber ribbon 1 in the present example, a plurality of (the number of the optical fiber ribbons is 16 in the present example) of the optical fibers 11 (11A to 11P in the present example) are arranged in parallel in a direction orthogonal to a longitudinal direction of the optical fibers 11. The 16 optical fibers 11A to 11P are connected by a resin in a manner in which adjacent optical fibers are at least partially brought into contact with each other.

The optical fiber ribbon 1 is an intermittent connection-type optical fiber ribbon in which, for every two optical fibers, a connected section 12 in a state where optical fibers are connected by a resin and a non-connected section 13 in a state where optical fibers are not connected by a resin are intermittently provided in the longitudinal direction for a part of or all of the plurality of optical fibers 11. In the optical fiber ribbon 1, the connected section 12 and the non-connected section 13 are provided between the optical fibers 11B and 11C, between the optical fibers 11D and 11E, between the optical fibers 11F and 11G, between the optical fibers 11H and 11I, between the optical fibers 11J and 11K, between the optical fibers 11L and 11M, and between the optical fibers 11N and 11O.

FIG. 1 shows the optical fiber ribbon 1 in a state where the non-connected section 13 is expanded in an arrangement direction of the optical fibers 11A to 11P. FIG. 2 is a cross-sectional view taken along a line A-A of the optical fiber ribbon 1 in FIG. 1. FIG. 3 is a cross-sectional view taken along the line A-A of the optical fiber ribbon 1 in a state where the non-connected section 13 is not expanded.

Although the intermittent connection-type optical fiber ribbon includes 16 optical fibers in the present example, the number of the optical fibers is not limited to 16. The number of the optical fibers may be 16 or more, and may be a multiple of 8. The number of the optical fibers may be 24, 32 . . . 96, and the like.

As shown in FIGS. 2 and 3, each of the optical fibers 11 includes, for example, a glass fiber 14 including a core and a cladding, and a two-layer coating layer that covers a periphery of the glass fiber 14. An inner coating layer of the two-layer coating layer is formed of a primary resin 15. An outer coating layer of the two-layer coating layer is formed of a secondary resin 16. A colored layer or the like may be provided on an outer side of the two-layer coating layer.

A soft resin having a relatively low Young's modulus is used as a buffer layer in the primary resin 15 that is in contact with the glass fiber 14. A hard resin having a relatively high Young's modulus is used as a protective layer in the secondary resin 16. The Young's modulus at 23° C. of the secondary resin 16 is, for example, 900 MPa or more, preferably 1000 MPa or more, and more preferably 1500 MPa or more.

The primary resin 15 and the secondary resin 16 are formed of an ultraviolet curable resin, a thermosetting resin, and the like. The optical fiber 11 has a bending loss of 0.25 dB/10 turns or less when a bending radius R is 15 mm. In order to increase lateral pressure resistance, a bending reinforced fiber specified in ITU-TG.657.A/B may be used as the optical fiber 11.

A tape resin 17 that connects the optical fibers 11A to 11P is provided around the optical fiber 11. The optical fibers 11A to 11P are arranged in parallel in a state where the optical fibers 11A to 11P are in contact with one another, and are connected by being collectively coated with the tape resin 17. The tape resin 17 that collectively coats the optical fibers 11A to 11P are provided in a manner of forming a shape having recessed portions 17a between the optical fibers corresponding to a depression formed between adjacent optical fibers. As described above, for every two optical fibers, the connected section 12 and the non-connected section 13 are intermittently provided in the tape resin 17 in the longitudinal direction. In this manner, every two optical fibers of the optical fiber ribbon 1 are intermittently connected by the tape resin 17 in the longitudinal direction of the optical fiber ribbon 1.

As shown in FIGS. 1 to 3, the non-connected section 13 of the optical fiber ribbon 1 is formed such that an end portion of a slit 13a passing through an upper surface and a lower surface of the optical fiber ribbon 1 relative to the tape resin 17 is cut into an acute angle relative to a boundary 13b between the non-connected section 13 and the connected section 12. The slit 13a is formed by cleaving the tape resin 17 in the recessed portion 17a provided between optical fibers.

An outer diameter B (see FIG. 3) of each of the optical fibers 11A to 11P is 160 μm or more and 220 μm or less. A distance C between centers of adjacent optical fibers among the optical fibers 11A to 11P is 170 μm or more and 230 μm or less. A thickness D of the optical fiber ribbon 1 is 255 μm or less. A width E of the optical fiber ribbon 1 (a width in an arrangement direction of the optical fibers) is 3.5 mm or less when the number of the optical fibers is 16.

Although the optical fiber ribbon 1 in the present example has a configuration in which the optical fibers 11A to 11P are arranged in parallel in a state where the optical fibers 11A to 11P are brought into contact with one another and a periphery of the optical fibers 11A to 11P is coated with the tape resin 17, the present invention is not limited to such a configuration. For example, the optical fibers 11A to 11P may be arranged in parallel in a state where a small gap is present between adjacent optical fibers, and the optical fibers 11A to 11P may be coated with the tape resin 17 in a state where the tape resin 17 enters the gap between adjacent optical fibers.

Figure 4:
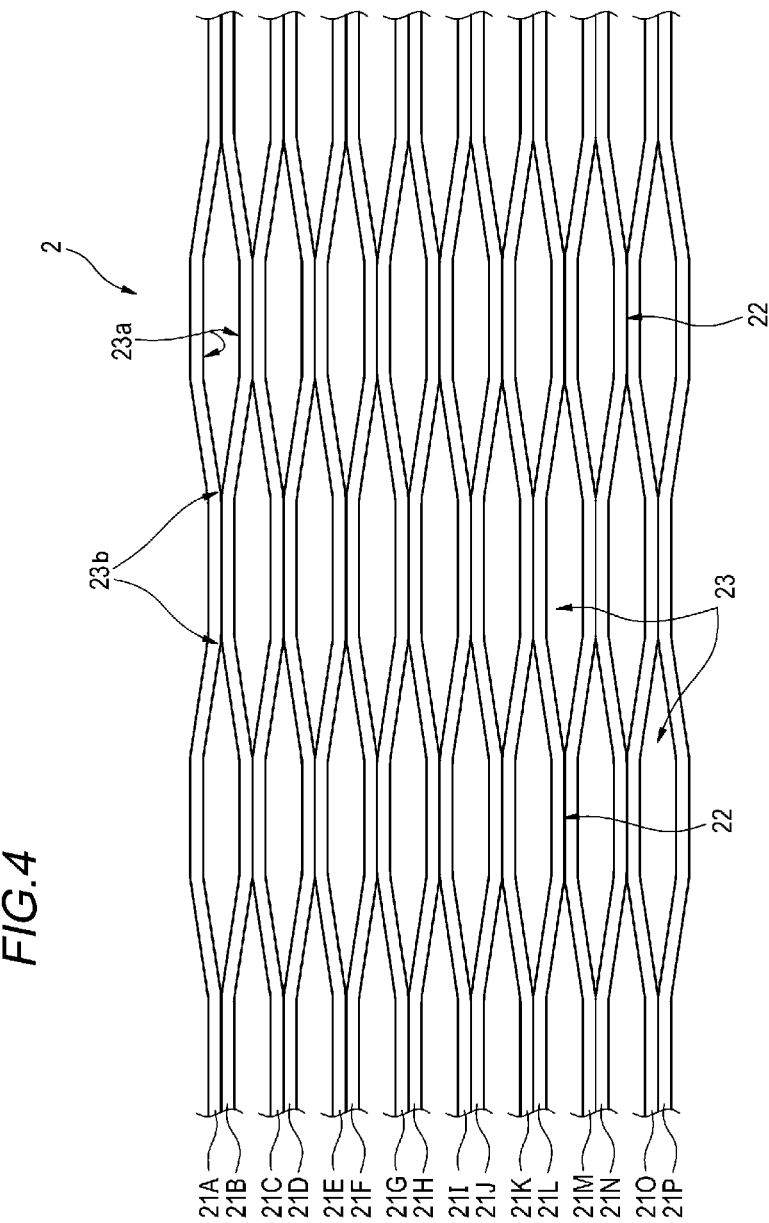
FIG. 4 is a view showing another example of an intermittent connection-type optical fiber ribbon according to the present embodiment.

FIG. 4 is a view showing another example of an optical fiber ribbon according to the present embodiment. As shown in FIG. 4, an optical fiber ribbon 2 in the present example is different from the optical fiber ribbon 1 in FIG. 1 in which the connected section 12 and the non-connected section 13 are provided for every two optical fibers, in that a connected section 22 and a non-connected section 23 are provided between optical fibers. Similar to the non-connected section 13 of the optical fiber ribbon 1 in FIG. 1, the non-connected section 23 is formed such that an end portion of a slit 23a is cut into an acute angle relative to a boundary 23b between the connected section 22 and the non-connected section 23.

The optical fiber ribbon 2 includes 16 optical fibers 21 (21A to 21P in the present example), and the number of the optical fibers is the same as that of the optical fiber ribbon 1 in FIG. 1. Other configurations, for example, a glass fiber and a coating layer constituting each optical fiber, an outer diameter B of the optical fiber, a distance C between centers of adjacent optical fibers, a bending loss of the optical fibers, a thickness D and a width E of the optical fiber ribbon, and the like are the same as those of the optical fiber ribbon 1 in FIG. 1.

Figure 5:
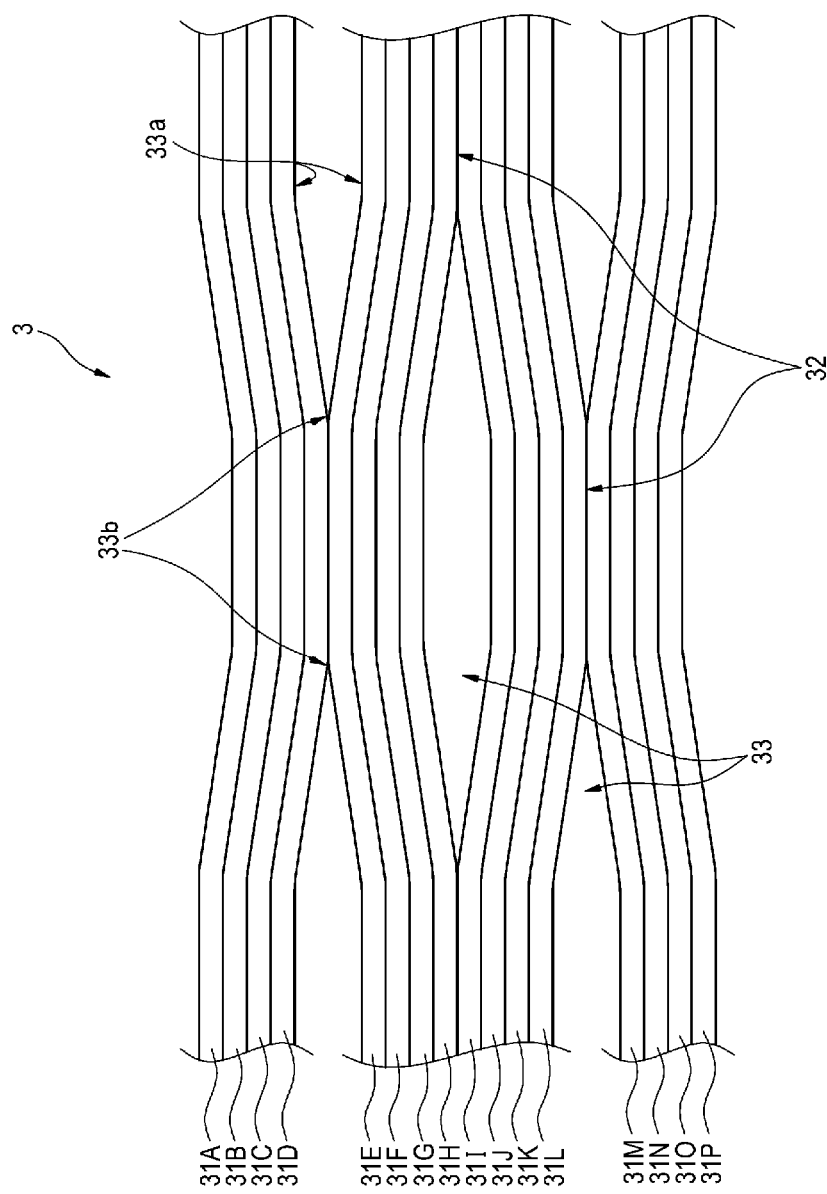
FIG. 5 is a view showing another example of an intermittent connection-type optical fiber ribbon according to the present embodiment.

FIG. 5 is a view showing another example of an optical fiber ribbon according to the present embodiment. As shown in FIG. 5, an optical fiber ribbon 3 in the present example is different from the optical fiber ribbon 1 in FIG. 1 in which the connected section 12 and the non-connected section 13 are provided for every two optical fibers, in that a connected section 32 and a non-connected section 33 are provided for every four optical fibers. Similar to the non-connected section 13 of the optical fiber ribbon 1 in FIG. 1, the non-connected section 33 is formed such that an end portion of a slit 33a is cut into an acute angle relative to a boundary 33b between the connected section 32 and the non-connected section 33.

The optical fiber ribbon 3 has 16 optical fibers 31 (31A to 31P in the present example), and the number of the optical fibers is the same as that of the optical fiber ribbon 1 in FIG. 1. Similar to the optical fiber ribbon 2 shown in FIG. 4, other configurations are the same as those of the optical fiber ribbon 1 shown in FIG. 1.

Figure 6:
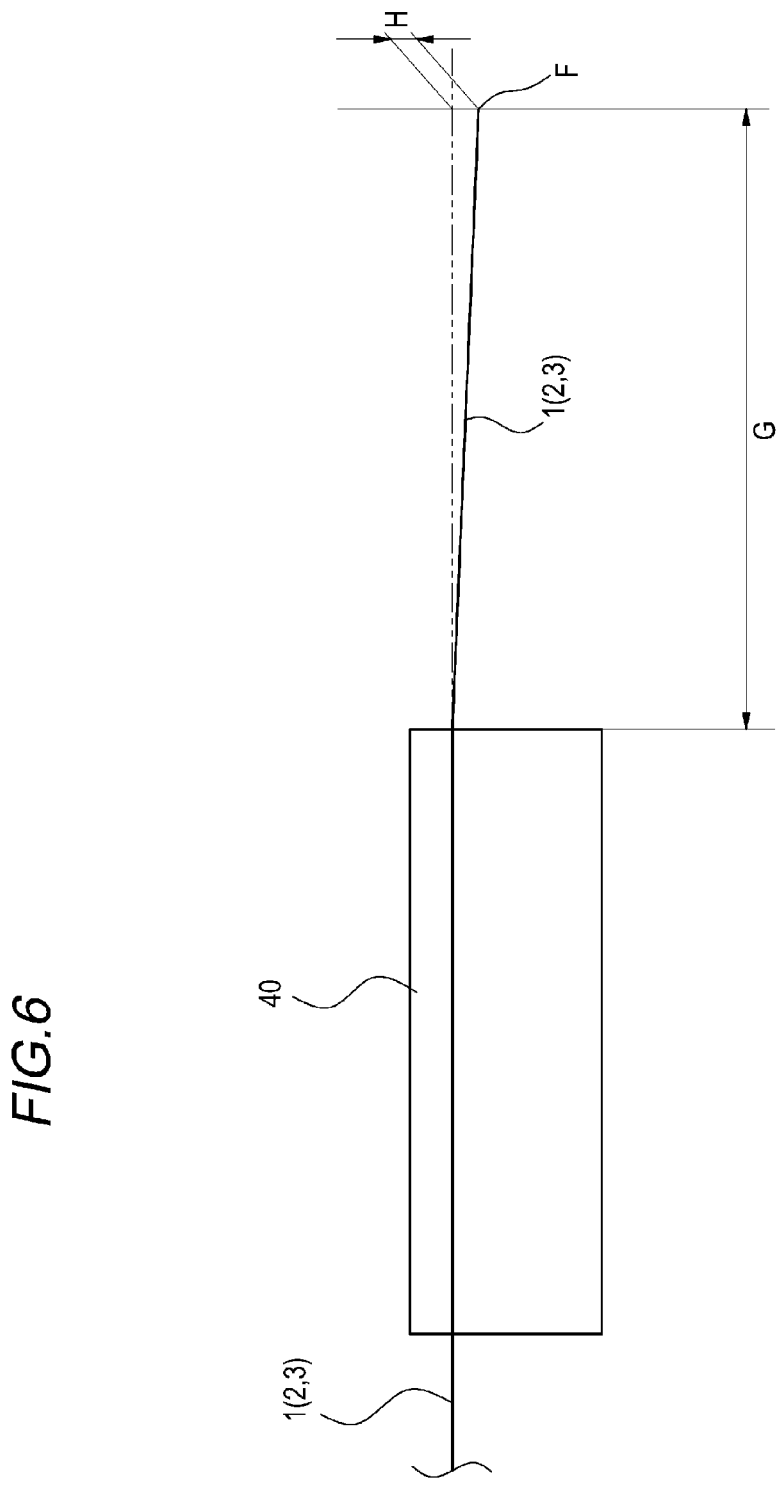
FIG. 6 is a view showing a catenary amount of the intermittent connection-type optical fiber ribbon.

FIG. 6 is a view showing catenary amounts of the optical fiber ribbons 1, 2, and 3 described above. As shown in FIG. 6, appropriate rigidity of each of the optical fiber ribbons is specified based on a deflection amount (catenary amount) of the optical fiber ribbon 1 (2, 3) when the optical fiber ribbon 1 (2, 3) is set in a fiber holder 40 for fusion and an axial misalignment error of optical fibers at the time of fusion in the present example.

Specifically, the fiber holder 40 holds the optical fiber ribbon 1 (2, 3) in a horizontal direction from a position of a length G of 30 mm with reference to a tip F to a predetermined position (for example, a position of 60 mm from the tip F). In the present example, a catenary amount H of the tip F of the cantilevered optical fiber ribbon 1 (2, 3) having a length G of 30 mm that protrudes from a portion that is held is measured. The tip F refers to a tip portion when the optical fiber ribbon 1 (2, 3) is cut along a direction orthogonal to the longitudinal direction of the optical fiber ribbon 1 (2, 3). When the catenary amount H is large, the tip of the optical fiber ribbon 1 (2, 3) spread in a width direction for each fiber at the time of fusion, and an axial misalignment between the optical fiber ribbons to be fused occurs. As a result, work efficiency is lowered. Therefore, in the present example, in order to prevent the axial misalignment of the optical fiber ribbons at the time of fusion, rigidity of the optical fiber ribbon 1 (2, 3) is specified so that the catenary amount H of the tip F of the optical fiber ribbon 1 (2, 3) is 2 mm or less.

Figure 7:
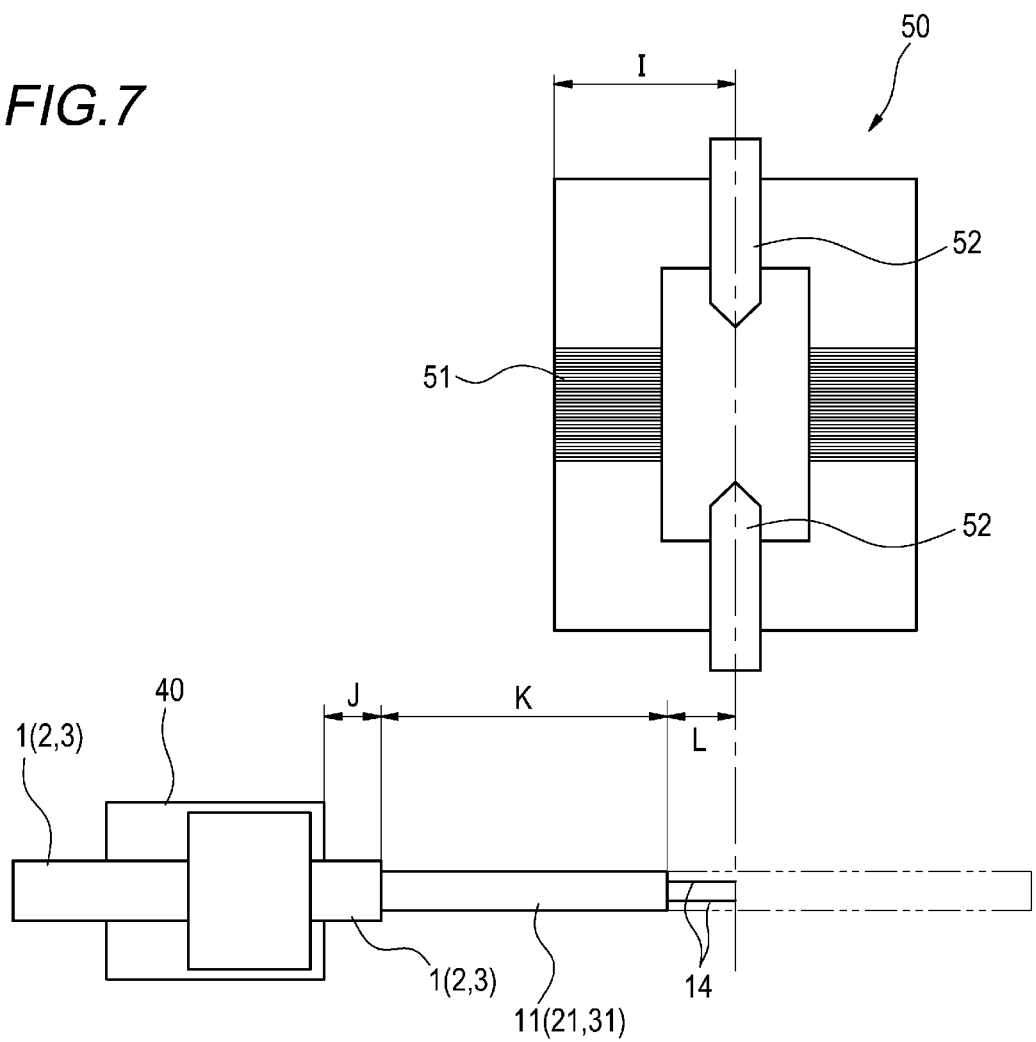
FIG. 7 is a view showing the intermittent connection-type optical fiber ribbon set in a fusion holder and a fusion splicer.

FIG. 7 is a view showing a positional relationship between a fusion splicer 50 and the optical fiber ribbon 1 (2, 3) set in the fiber holder 40 at the time of fusing the optical fiber ribbon 1 (2, 3). As shown in FIG. 7, the fusion splicer 50 is provided with a V groove 51 in which the optical fibers 11 (21, 31) of the optical fiber ribbon 1 (2, 3) are accommodated, and a discharge unit 52 including a pair of electrodes for discharging. For example, a distance I from a side end portion of the fusion splicer 50 to a central position of the discharge unit 52 is 8 mm.

The optical fiber ribbon 1 (2, 3) set in the fiber holder 40 at the time of fusion is, for example, in a state where the optical fiber ribbon 1 (2, 3) includes the tape resin 17 from a tip of the fiber holder 40 to a portion having a length J of 3 mm to the tip in a portion protruding from the tip of the fiber holder 40. A portion from the portion having the length J to a portion having a length K of 10 mm toward the tip of the optical fiber ribbon 1 (2, 3) is in a state where the tape resin 17 is peeled off from the optical fibers 11 (21, 31). A portion having a length L of 0.5 mm to 2 mm from the tip of the optical fiber 11 (21, 31) is in a state where the primary resin 15 and the secondary resin 16 are peeled off from the glass fiber 14. Then, two optical fiber ribbons respectively set on two fiber holders 40 are arranged relative to the fusion splicer 50 such that tips of the glass fibers 14 abut each other between the pair of electrodes of the discharge unit 52. At this time, the portion of the optical fiber 11 (21, 31) from which the tape resin 17 is peeled off is accommodated in each V groove 51 of the fusion splicer 50. For example, arc discharge is performed from the pair of electrodes of the discharge unit 52, and the two optical fiber ribbons 1 (2, 3) are fused to each other.

On the other hand, in the measurement in FIG. 6, when the catenary amount H of the tip F of the optical fiber ribbon 1 (2, 3) is small, the rigidity of the optical fiber ribbon 1 (2, 3) is large. In a case where the rigidity of the optical fiber ribbon 1 (2, 3) is too large, when a bending pressure is applied to the optical fiber ribbon 1 (2, 3), the optical fiber ribbon 1 (2, 3) cannot absorb the bending pressure. When the optical fiber ribbon 1 (2, 3) is mounted in an optical fiber cable at a high density, a macro bending loss is likely to occur. Therefore, in order to prevent the occurrence of the macro bending loss when a bending pressure is applied, the rigidity of the optical fiber ribbon 1 (2, 3) is specified such that the catenary amount H of the tip F of the optical fiber ribbon 1 (2, 3) is 0.1 mm or more in the present example.

In the optical fiber ribbon 1 (2, 3), an outer diameter of the optical fiber 11 (21, 31) is 160 µm or more and 220 µm or less. The optical fiber ribbon 1 (2, 3) is configured such that when the optical fiber ribbon 1 (2, 3) is held in the horizontal direction from a position of 30 mm with reference to the tip of the optical fiber ribbon 1 (2, 3) to a predetermined position, the catenary amount of the tip is 0.1 mm or more and 2 mm or less. Since the catenary amount of the optical fiber ribbon 1 (2, 3) is 2 mm or less, the rigidity of the optical fiber ribbon 1 (2, 3) is appropriately large. Even when the optical fiber ribbon 1 (2, 3) is set in the fiber holder 40 at the time of fusion, the optical fiber 11 (21, 31) is less likely to be deflected. Therefore, when fusion-splicing is collectively performed, the tip of the optical fiber ribbon 1 (2, 3) does not spread in the width direction for each fiber, an axial misalignment between the optical fiber ribbons to be fused is less likely to occur. When the fused optical fiber ribbon 1 (2, 3) is conveyed to, for example, a protective sleeve heating unit that is a subsequent manufacturing process, local bending of the optical fiber ribbon 1 (2, 3) is less likely to occur. Therefore, it is possible to efficiently perform a connection work of the optical fiber ribbon 1 (2, 3) in the present example.

Since the optical fiber ribbon 1 (2, 3) has the catenary amount of 0.1 mm or more, the rigidity of the optical fiber ribbon 1 (2, 3) is not too large. Therefore, the optical fiber ribbon 1 (2, 3) can be appropriately deformed against a bending pressure and can absorb the bending pressure. Therefore, when the optical fiber ribbon 1 (2, 3) is mounted in an optical fiber cable at a high density, a macro bending loss due to an extremely small bending radius is less likely to occur.

In the optical fiber ribbon 1 (2, 3), the Young's modulus at, for example, 23° C. of the secondary resin 16 that forms a coating layer outside the optical fiber 11 (21, 31) is 900 MPa or more. Since the secondary resin 16 has appropriate hardness, a micro bending loss is less likely to occur even when an uneven lateral pressure is applied to the optical fiber 11 (21, 31). Therefore, a lateral pressure property of the optical fiber ribbon 1 (2, 3) can be improved in the present example.

The optical fiber ribbon 1 (2, 3) is configured such that the number of optical fibers is 16, and a width in the arrangement direction of the optical fibers is 3.5 mm or less. The width is equal to a width of a 12-core optical fiber ribbon in the related art in which an outer diameter of the optical fiber is 250 µm. As a result, even the number of the optical fibers is 16 in the optical fiber ribbon 1 (2, 3) in the present example, the optical fibers can be collectively fusion-spliced using a fusion-splicer that collectively fusion-spliced the 12-core optical fiber ribbon in the related art.

The optical fiber ribbon 1 (2, 3) is configured such that the distance C between the centers of adjacent optical fibers 11 (21, 31) is 200 µm±30 µm. Therefore, a width in an arrangement direction of the optical fibers 11 (21, 31) of the optical fiber ribbon 1 (2, 3) can be reduced in the present example.

For the 12-core optical fiber ribbon in the related art, when a bidirectional transmission is performed for every four fibers, eight fibers are used and the remaining four fibers are not used among the 12 fibers. In contrast, since the optical fiber ribbon 1 (2, 3) has optical fibers whose number is a multiple of 8, it is easy to perform a bidirectional transmission for every four cores using all of the optical fibers 11 (21, 31) in the present example. Even in the case of a multi-core optical fiber ribbon 1 (2, 3) having 16 or more cores, the rigidity is not too large, and the optical fiber ribbon 1 (2, 3) can be appropriately deformed against a bending pressure.

Since the optical fiber ribbon 1 (2, 3) is configured such that a bending loss is 0.25 dB/10 turns or less when the bending radius R of the optical fiber is 15 mm, the bending loss of the optical fiber ribbon 1 (2, 3) can be sufficiently reduced in the present example.

In the optical fiber ribbon 1 (2, 3), the non-connected section 13 (23, 33) is formed such that, between adjacent optical fibers, an end portion of the slit 13a (23a, 33a) passing through the upper surface and the lower surface of the optical fiber ribbon 1 (2, 3) relative to the tape resin 17 is cut into an acute angle relative to the boundary 13b (23b, 33b) between the connected section 12 (22, 32) and the non-connected section 13 (23, 33).

Accordingly, the tape resin 17 of the connected section 12 (22, 32) between optical fibers where the non-connected section 13 (23, 33) is formed can be easily ripped starting from the boundary 13b (23b, 33b) where the end portion of the slit 13a (23a, 33a) is formed by cutting the end portion into an acute angle in the present example.

In the optical fiber ribbon 3, since the non-connected section 13 (23, 33) is formed for every four cores, the optical fiber ribbon 3 can be easily divided for every four or a number of a multiple of four cores.

Figure 8:
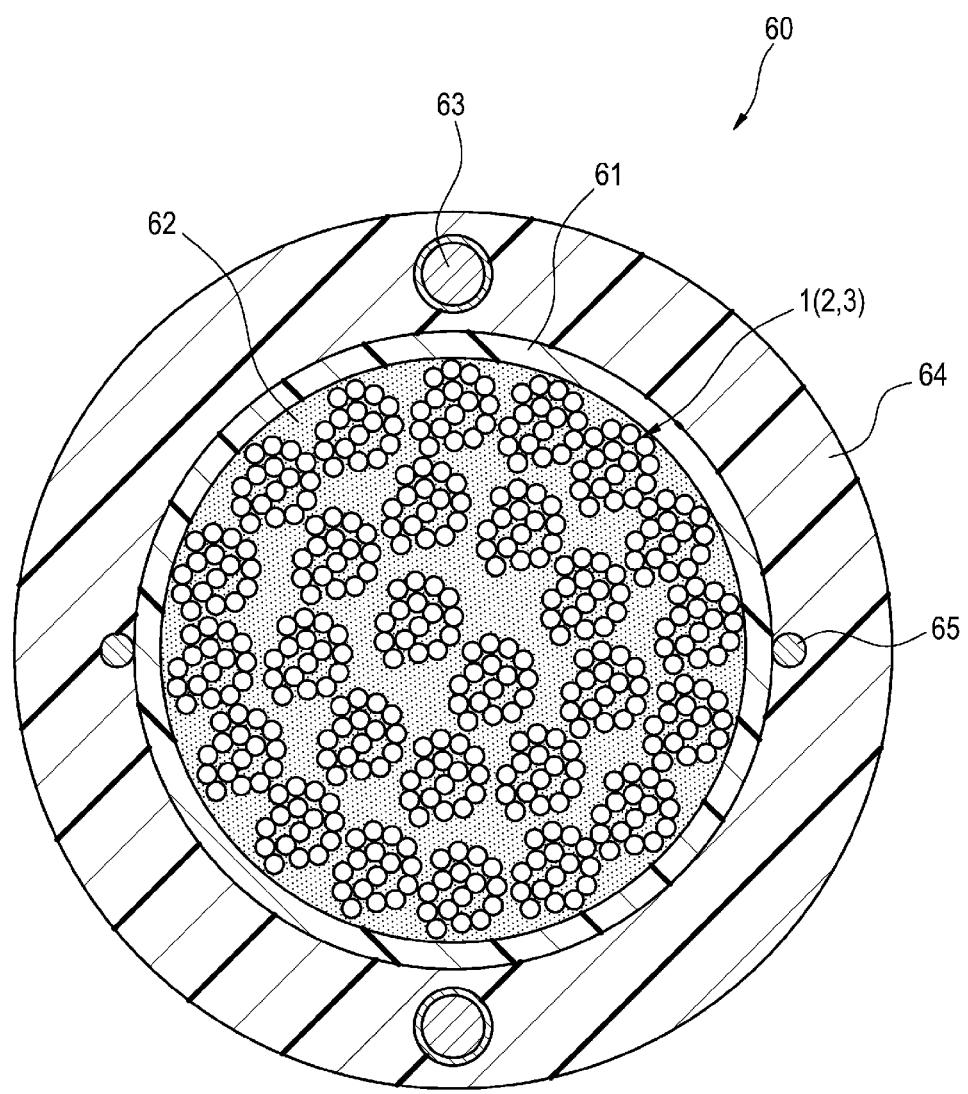
FIG. 8 is a cross-sectional view showing an example of an optical fiber cable according to the present embodiment.

Next, an optical fiber cable according to the present embodiment will be described with reference to FIGS. 8 and 9. FIG. 8 is a view showing an example of a slotless type optical fiber cable using the optical fiber ribbon 1 (2, 3)

according to the present embodiment. FIG. 9 is a view showing an example of a slot type optical fiber cable using the optical fiber ribbon 1 (2, 3) according to the present embodiment.

A slotless type optical fiber cable 60 shown in FIG. 8 includes a cylindrical tube 61 and a plurality of optical fiber ribbons 1 (2, 3) mounted in the tube 61. The optical fiber ribbons 1 (2, 3) are assembled in a manner of being rolled and are stranded together. In addition, a plurality of fillers 62 (tensile strength fibers or the like) are accommodated in the tube 61 so as to fill gaps among the optical fiber ribbons 1 (2, 3). An outer sheath 64 covers a periphery of the tube 61 together with a tension member 63. A rip cord 65 is provided inside the outer sheath 64.

In the optical fiber cable 60, a core density of the optical fibers 11 (21, 31) per unit area in a cable cross section is 4.5 core/mm$^2$ or more. The core density is calculated by the number of optical fibers and/or a cross-sectional area of the optical fiber cable. For example, the slotless type optical fiber cable 60 shown in FIG. 8 has 432 cores and when the optical fiber cable 60 having an outer diameter of 11 mm is manufactured, the optical fibers 11 (21, 31) can be mounted in the optical fiber cable 60 at a core density of 4.55 core/mm$^2$.

Figure 9:
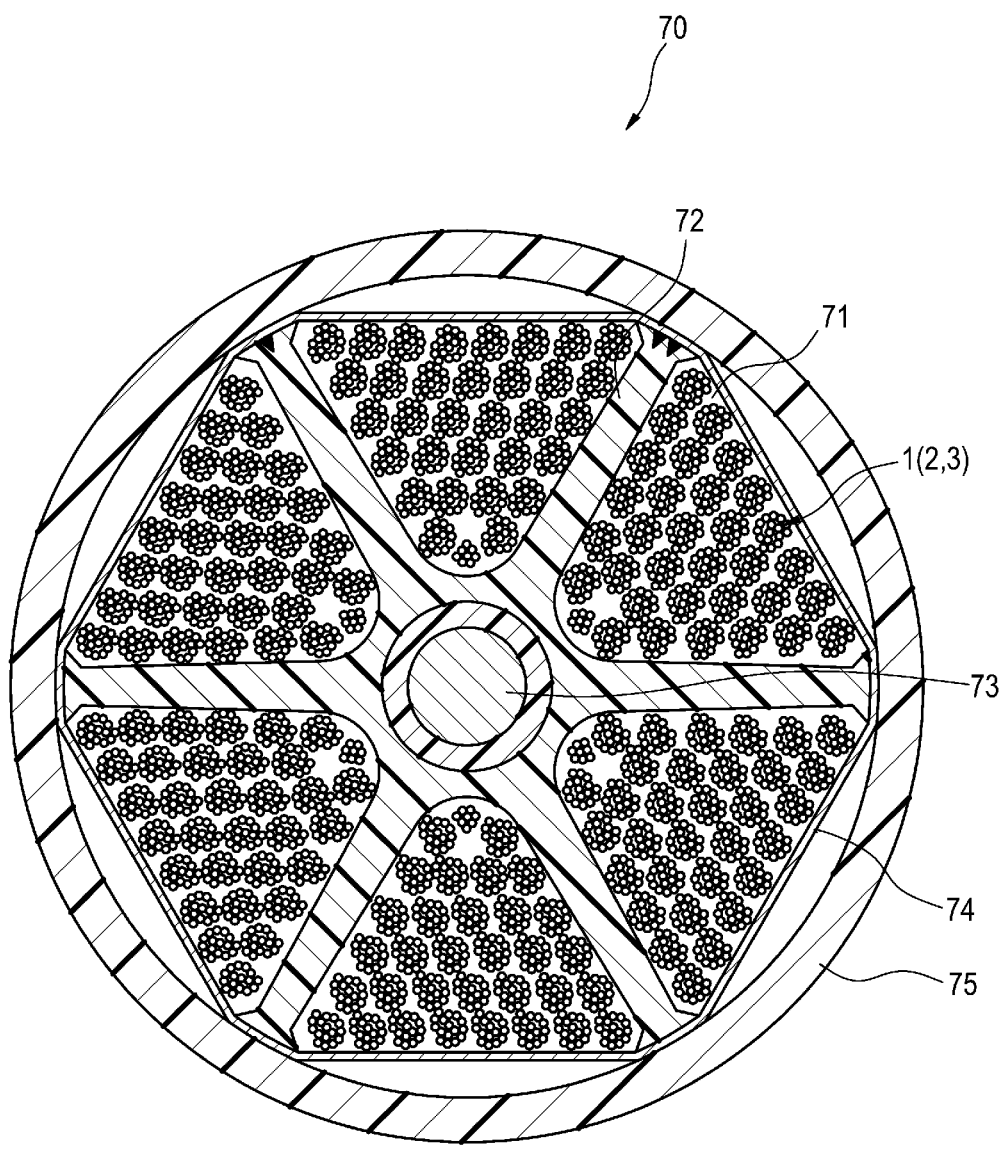
FIG. 9 is a cross-sectional view showing another example of the optical fiber cable according to the present embodiment.

A slot type optical fiber cable 70 shown in FIG. 9 includes a slot rod 72 having a plurality of slot grooves 71, and a plurality of optical fiber ribbons 1 (2, 3) accommodated in the slot grooves 71. The slot rod 72 is provided with a tension member 73 at the center of the optical fiber cable 70, and has a structure in which the plurality of slot grooves 71 are provided radially. The optical fiber ribbons 1 (2, 3) are assembled in a manner of being rolled, are stranded together, and are accommodated in the slot grooves 71. A press winding tape 74 is wound around the slot rod 72, and an outer sheath 75 is formed around the press winding tape 74.

A core density of the optical fiber cable 70 is 4.55 core/mm$^2$ or more. For example, the slot type optical fiber cable 70 shown in FIG. 9 has 3120 cores and when the optical fiber cable 70 having an outer diameter of 28 mm is manufactured, the optical fibers 11 (21, 31) can be accommodated in the optical fiber cable 70 at a core density of 5.07 core/mm$^2$.

The optical fiber cables 60 and 70 are configured such that the core density of each of the optical fiber cables is 4.5 core/mm$^2$ or more. Therefore, the optical fibers 11 (21, 31) can be mounted in the optical fiber cables 60 and 70 at a high density in the present example. In addition, rigidity of the optical fiber ribbons 1 (2, 3) mounted in the optical fiber cables 60 and 70 is appropriately large in the present example. Therefore, when the optical fiber ribbons 1 (2, 3) are taken out from the optical fiber cables 60 and 70 in which the optical fibers 11 (21, 31) are mounted at a high density, and the optical fibers 11 (21, 31) are collectively fusion-spliced, the optical fibers 11 (21, 31) are less likely to be deflected, and tips of the optical fibers 11 (21, 31) are less likely to be misaligned. The fused optical fiber ribbons 1 (2, 3) that are taken out from the optical fiber cables 60 and 70 in a manner described above are less likely to be locally bent when, for example, the optical fiber ribbons 1 (2, 3) are conveyed to a protective sleeve heating unit in a subsequent manufacturing process.

Since the rigidity of the optical fiber ribbons 1 (2, 3) is not too large, the optical fiber ribbons 1 (2, 3) can be appropriately deformed against a bending pressure, and can absorb the bending pressure.

Therefore, when the optical fiber ribbons 1 (2, 3) are mounted in the optical fiber cables 60 and 70 at a high density, a macro bending loss that is a bending loss due to an extremely small bending radius is less likely to occur.

Figure 10:
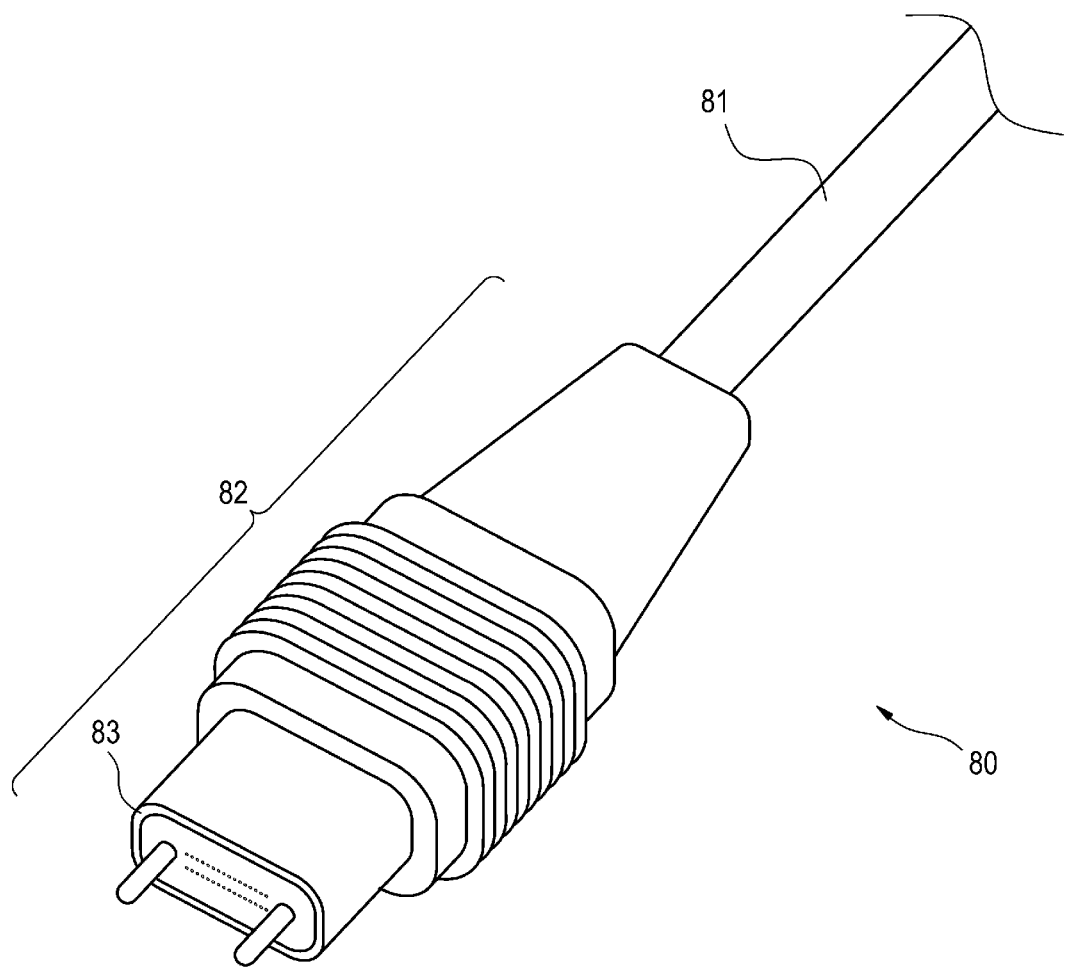
FIG. 10 is a perspective view showing an example of a connector-equipped optical fiber cord according to the present embodiment.
Figure 11:
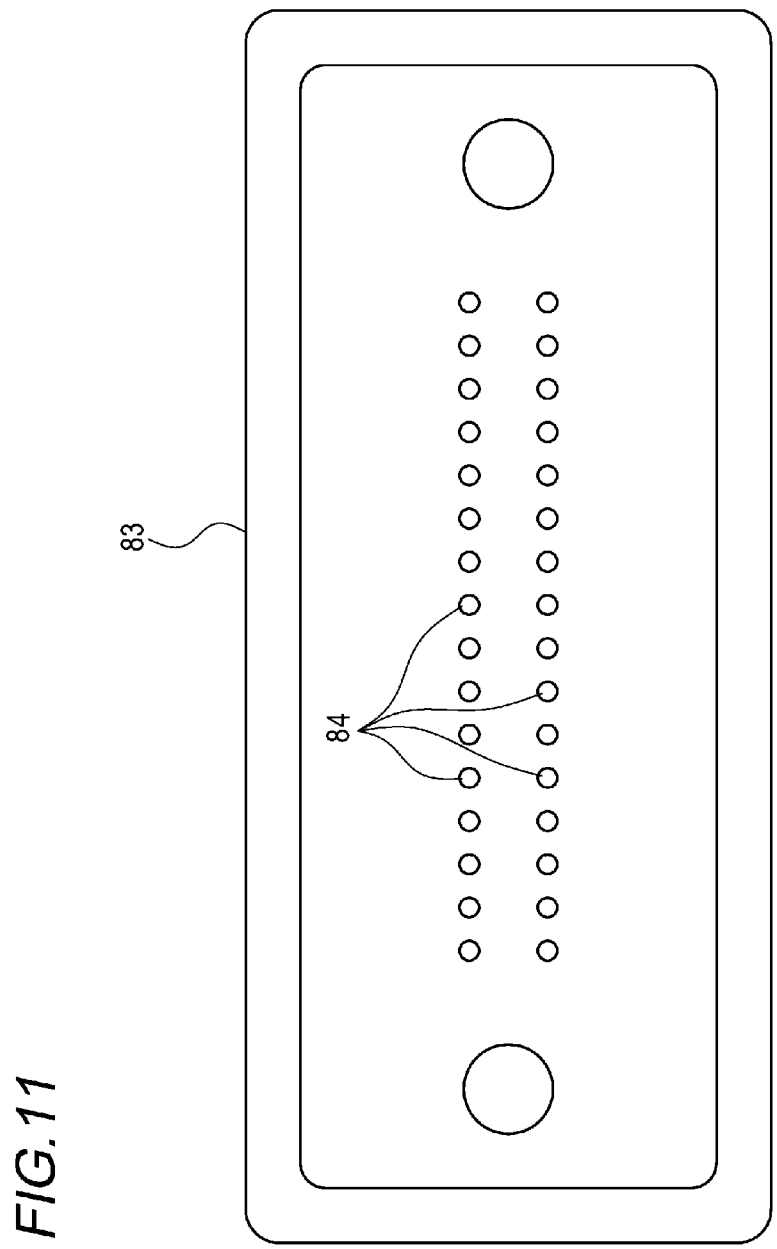
FIG. 11 is a front view showing a connector insertion and removal portion of the connector-equipped optical fiber cord shown in FIG. 10.

Next, a connector-equipped optical fiber cord according to the present embodiment will be described with reference to FIGS. 10 and 11. FIG. 10 is a view showing an example of a connector-equipped optical fiber cord using the optical fiber ribbon 1 (2, 3) according to the present embodiment. FIG. 11 is a front view showing a connector insertion and removal portion of the connector-equipped optical fiber cord shown in FIG. 10.

As shown in FIG. 10, a connector-equipped optical fiber cord 80 includes an optical fiber cord 81 in which the optical fiber ribbon 1 (2, 3) is accommodated, and a connector portion 82 connected to the optical fiber cord 81. For example, two 16-core optical fiber ribbons or one 32-core optical fiber ribbon is accommodated in the optical fiber cord 81. The connector portion 82 is formed of a multi-fiber push-on (MPO) connector that can collectively connect a plurality of optical fibers. As shown in FIG. 11, the connector portion 82 includes an insertion and removal portion 83 to be inserted into or removed from another connector, adapter, or the like. The insertion and removal portion 83 is provided with 32 (16×2 rows) through holes 84 into which tip portions of the respective optical fibers 11 (21, 31) of the optical fiber ribbon 1 (2, 3) are inserted.

The optical fiber ribbon 1 (2, 3) provided in the connector-equipped optical fiber cord 80 has appropriately large rigidity. Therefore, when the optical fibers 11 (21, 31) are disassembled from one another and are set in the connector portion 82 during manufacturing the connector-equipped optical fiber cord 80, the optical fibers are less likely to be deflected. Therefore, in the connector-equipped optical fiber cord 80, the optical fibers 11 (21, 31) of the multi-core optical fiber ribbon 1 (2, 3) that has 16 or more cores and are accommodated in the connector portion 82 can be easily set (wired) in a desired arrangement and at a desired arrangement pitch. Therefore, it is easy to manufacture the connector-equipped optical fiber cord 80.

Since the rigidity of the optical fiber ribbon 1 (2, 3) is not too large, the optical fiber ribbon 1 (2, 3) can be appropriately deformed against a bending pressure, and can absorb the bending pressure. Therefore, when the optical fiber ribbon 1 (2, 3) is mounted in the optical fiber cord 81 at a high density, a macro bending loss that is a bending loss due to an extremely small bending radius is less likely to occur.

EXAMPLE

In the intermittent connection-type optical fiber ribbon according to the present embodiment, connection workability and a high density property were evaluated for a plurality of samples having different catenary amounts H. Evaluation results are shown in a Table 1 together with an evaluation for a non-intermittent optical fiber ribbon serving as a comparative example.

TABLE 1

| Sample No. | Intermittent pattern | Connected section ratio | Catenary amount H | Connection workability | High density property |
|---|---|---|---|---|---|
| 1 | Every one core | 0.1 | 3.5 mm | B (2.0) | S (core density 5.5) |
| 2 | Every one core | 0.2 | 2.0 mm | A (1.5) | S (core density 5.3) |
| 3 | Every one core | 0.4 | 0.8 mm | A (1.2) | A (core density 5.0) |
| 4 | Every one core | 0.5 | 0.3 mm | A (1.06) | A (core density 4.5) |
| 5 | Every two cores | 0.1 | 0.8 mm | A (1.2) | A (core density 5.0) |
| 6 | Every two cores | 0.2 | 0.6 mm | A (1.1) | A (core density 4.7) |
| 7 | Every two cores | 0.4 | 0.3 mm | A (1.05) | A (core density 4.5) |
| 8 | Every two cores | 0.5 | 0.1 mm | S (1.0) | B (core density 4.0) |
| 9 | Non-intermittent | — | 0 mm | S (1.0) | B (core density 4.0) |

In Table 1, all of samples No. 1 to 9 were 16-core optical fiber ribbons, and a resin having a Young's modulus of 900 MPa at 23° C. was used for the secondary resin 16 of an optical fiber in each of the optical fiber ribbons. An outer diameter of each optical fiber is 200 μm. The samples No. 1 to 8 are intermittent connection-type optical fiber ribbons, and the sample No. 9 is a non-intermittent optical fiber ribbon serving as a comparative example. In the samples No. 1 to No. 4, an intermittent pattern is for every one core, and the intermittent pattern is the same as that of the optical fiber ribbon 2. In the samples No. 5 to 8, an intermittent pattern is for every two cores, and the intermittent pattern is the same as that of the optical fiber ribbon 1.

A connected section ratio represents a ratio of a length of the connected section to a length of the non-connected section in the longitudinal direction of the intermittent connection-type optical fiber ribbon. When the connected section ratio is large, a region occupied by the connected section in the intermittent connection-type optical fiber ribbon is large, and the rigidity of the intermittent connection-type optical fiber ribbon is large. Therefore, the intermittent connection-type optical fiber ribbon is less likely to be deflected, and the catenary amount H is small.

On the other hand, when the connected section ratio is small, a region occupied by the connected section in the intermittent connection-type optical fiber ribbon is small, and the rigidity of the intermittent connection-type optical fiber ribbon is small. Therefore, the intermittent connection-type optical fiber ribbon is likely to be deflected, and the catenary amount H is large.

As described above, in the intermittent connection-type optical fiber ribbon, the catenary amount H is changed by changing the connected section ratio.

The connection workability is a relative value obtained by setting a work time of the sample No. 9 that is a non-intermittent optical fiber ribbon to 1.0 when the fiber holder 40 and the fusion splicer 50 shown in FIG. 7 are used to perform a fusion work of the optical fiber ribbon. When the connection workability exceeded 1.5, it was determined that the workability was poor, and an evaluation B was given. When the connection workability was 1.5 or less, it was determined that the workability was good, and an evaluation A was given. Furthermore, one having connection workability of 1.0 (equal to that of the non-intermittent connection-type) was determined to be better workability, and an evaluation S was given. That is, samples having the evaluation A or the evaluation S are intermittent connection-type optical fiber ribbons having good connection workability.

The high density property was evaluated by a maximum core density at which the optical fiber ribbons in the samples described above can be mounted in the optical fiber cable 60 such that a wavelength of signal light was 1.55 μm and a bending loss was 0.3 dB/km or less when the optical fiber ribbons in the samples described above were mounted in the optical fiber cable 60. An evaluation criteria was set in which the high density property was determined as good such that when a core density was larger than a core density (4.0 core/mm$^2$) of the sample No. 9 that is a non-intermittent optical fiber ribbon, an evaluation A was given when a core density was 4.5 core/mm$^2$ or more and 5.0 core/mm$^2$ or less, and an evaluation S was given when a core density exceeded 5.0 core/mm$^2$. The high density property was determined as poor and an evaluation B was given when a core density was 4.0 core/mm$^2$ or less. That is, samples having the evaluation A or the evaluation S are intermittent connection-type optical fiber ribbons having a good high density property.

According to the evaluation results shown in Table 1, samples having good connection workability and a high density property (samples having the evaluation A or the evaluation S) were No. 2 to No. 7. As a result, it was found that both the connection workability and the high density property of the intermittent connection-type optical fiber ribbon were good when the catenary amount H was 0.3 mm or more and 2.0 mm or less.

In order to further increase a core density, an increase in the Young's modulus of the secondary resin 16 of the optical fiber was discussed. As a result, it could be confirmed that each of the core densities shown in the column of high density property in Table 1 can be improved by about 0.5 core/mm$^2$ when the secondary resin 16 uses a resin having a Young's modulus of 1500 MPa at 23° C. Therefore, it was found that when the Young's modulus of the secondary resin 16 was set to 1500 MPa and the catenary amount H of the intermittent connection-type optical fiber ribbon was set to 0.1 mm or more and 2.0 mm or less, the connection workability and the high density property were further improved.

In a case where the same 16-core optical fiber ribbon as those in the samples No. 1 to No. 9 were used and an intermittent pattern was for every four cores, both the connection workability and the high density property were good when the catenary amount H was 0.3 mm or more and 2.0 mm or less.

Although the present disclosure has been described in detail with reference to a specific embodiment, it will be apparent to those skilled in the art that various changes and modifications can be made without departing from the spirit and scope of the present disclosure. The numbers, positions, shapes, and the like of components described above are not limited to the embodiment described above and can be changed to suitable numbers, positions, shapes, and the like on a premise that the present disclosure is achieved.

REFERENCE SIGNS LIST 1, 2, 3 optical fiber ribbon
11, 21, 31 optical fiber
12, 22, 32 connected section
13, 23, 33 non-connected section
13a, 23a, 33a slit
13b, 23b, 33b boundary
14 glass fiber
15 primary resin
16 secondary resin
17 tape resin
40 fiber holder
50 fusion splicer
51 V groove
52 discharge unit
60, 70 optical fiber cable
61 tube
64 outer sheath
71 slot groove
72 slot rod
75 outer sheath
80 connector-equipped optical fiber cord
81 optical fiber cord
82 connector portion
83 insertion and removal portion
84 through hole

The invention claimed is:

1. An intermittent connection-type optical fiber ribbon comprising:
a plurality of optical fibers that includes a connected section in which adjacent optical fibers of the optical fibers are connected to each other, and a non-connected section in which adjacent optical fibers are not connected to each other, the connected section and the non-connected section being intermittently provided in a longitudinal direction of the plurality of optical fibers in a part or all of places between the plurality of optical fibers in a state where the plurality of optical fibers are arranged in a direction orthogonal to the longitudinal direction,
wherein an outer diameter of each of the plurality of optical fibers is 160 μm or more and 220 μm or less,
wherein when the intermittent connection-type optical fiber ribbon is held in a horizontal direction at a section from a position which is 30 mm away from a tip of the intermittent connection-type optical fiber ribbon to a predetermined position, a catenary amount of the tip of the intermittent connection-type optical fiber ribbon that protrudes from a held section is 0.1 mm or more and 2 mm or less,
wherein a ratio of i) a length from one end of the connected section to an other end of the connected section to ii) a length from one end of the non-connected section to an other end of the non-connected section is more than 0.2 and less than 0.5, the length from one end of the connected section to the other end of the connected section extending on a same row in the longitudinal direct as the length from one end of the non-connected section to the other end of the non-connected section,
wherein a length between two immediate adjacent non-connected sections is in the longitudinal direction,
wherein the number of the plurality of optical fibers is a multiple of 8, and is 16 or more, and
wherein an intermittent pattern of the intermittent connection-type optical fiber ribbon is for every two fiber cores.

2. The intermittent connection-type optical fiber ribbon according to claim 1,
wherein the number of the plurality of optical fibers is 16, and a full width of the plurality of the optical fibers in an arrangement direction of the plurality of optical fibers is 3.5 mm or less.

3. The intermittent connection-type optical fiber ribbon according to claim 1,
wherein a distance between centers of adjacent optical fibers is 200 μm±30 μm.

4. The intermittent connection-type optical fiber ribbon according to claim 1,
wherein the plurality of optical fibers have a bending loss of 0.25 dB/10 turns or less when a bending radius R is 15 mm.

5. The intermittent connection-type optical fiber ribbon according to claim 1,
wherein each of the plurality of optical fibers include a glass fiber and a two-layer coating layer that covers a periphery of the glass fiber,
wherein an inner coating layer of the two-layer coating layer is formed of a primary resin,
wherein an outer coating layer of the two-layer coating layer is formed of a secondary resin, and
wherein the secondary resin has a Young's modulus of 900 MPa or more at 23° C.

6. The intermittent connection-type optical fiber ribbon according to claim 1,
wherein the connected section and the non-connected section are formed for every four cores,
wherein the intermittent connection-type optical fiber ribbon includes the connected section where a tape resin that covers the optical fibers is continuous between adjacent optical fibers, and the non-connected section where a slit that passes through the tape resin from an upper surface to a lower surface of the intermittent connection-type optical fiber ribbon is formed between adjacent optical fibers, and
wherein an end portion of the slit is cut into an acute angle relative to a boundary between the connected section and the non-connected section.

7. An optical fiber cable comprising:
the intermittent connection-type optical fiber ribbon according to claim 1 that is mounted in the optical fiber cable,
wherein a core density of the optical fiber cable is 4.5 core/mm2 or more.

8. A connector-equipped optical fiber cord comprising:
an optical fiber cord including the intermittent connection-type optical fiber ribbon according to claim 1; and
a connector connected to the optical fiber cord.

* * * * *